(12) United States Patent
Bender

(10) Patent No.: US 6,510,620 B2
(45) Date of Patent: Jan. 28, 2003

(54) TOOL AND METHOD FOR THE PRECISION BORING OF HOLES

(76) Inventor: Robert G. Bender, 725 Sapphire St., Redondo Beach, CA (US) 90277

( * ) Notice: Subject to any disclaimer, the term of this patent is extended or adjusted under 35 U.S.C. 154(b) by 0 days.

(21) Appl. No.: 09/813,731

(22) Filed: Mar. 22, 2001

(65) Prior Publication Data
US 2001/0034950 A1 Nov. 1, 2001

Related U.S. Application Data

(60) Provisional application No. 60/197,360, filed on Apr. 15, 2000.

(51) Int. Cl.⁷ .................... B23Q 17/22; B23B 49/00; B27G 23/00
(52) U.S. Cl. .................... 33/636; 33/613; 33/639; 269/236; 269/287
(58) Field of Search .................... 33/613, 626, 628, 33/636, 637, 639; 24/328, 273, 270; 248/229.13, 229.23, 230.4, 231.51; 269/236, 287, 43

(56) References Cited

U.S. PATENT DOCUMENTS

| | | | | |
|---|---|---|---|---|
| 1,421,073 A | * | 6/1922 | Furness et al. | 33/636 |
| 1,678,030 A | * | 7/1928 | Yount | 33/636 |
| 1,822,599 A | * | 9/1931 | Monk | 33/613 |
| 2,093,743 A | | 9/1937 | Steiner | |
| 2,872,736 A | * | 2/1959 | Abbott | 33/637 |
| 2,886,896 A | * | 5/1959 | Humphreville | 33/637 |
| 3,044,322 A | | 7/1962 | George | |
| 3,044,323 A | | 7/1962 | Sweeny | |
| 3,067,636 A | | 12/1962 | Breuning | |
| 3,201,156 A | * | 8/1965 | Coats | 24/273 |
| 3,224,106 A | * | 12/1965 | Way | 33/613 |
| 3,582,127 A | * | 6/1971 | Johnson | 294/112 |
| 3,612,559 A | * | 10/1971 | Petersen et al. | 280/628 |
| 3,764,204 A | * | 10/1973 | Kammeraad | 408/103 |
| 3,781,999 A | * | 1/1974 | Colangelo | 33/639 |
| 4,132,001 A | * | 1/1979 | Petrik | 33/501.45 |
| 4,451,992 A | * | 6/1984 | Malak | 33/613 |
| 4,470,198 A | * | 9/1984 | Schering | 33/628 |
| 4,639,979 A | * | 2/1987 | Polson | 24/273 |
| 4,648,757 A | | 3/1987 | Plummer | |
| 4,784,536 A | | 11/1988 | Pfalzgraf | |
| 5,035,554 A | | 7/1991 | Nickols | |
| 5,193,950 A | | 3/1993 | Hunt | |
| 5,259,690 A | * | 11/1993 | Legge | 24/270 |
| 5,428,899 A | * | 7/1995 | Radossi et al. | 33/613 |
| 5,666,711 A | * | 9/1997 | Pfeiffer | 269/43 |
| 6,272,762 B1 | * | 8/2001 | Kinast et al. | 33/504 |

* cited by examiner

Primary Examiner—Diego Gutierrez
Assistant Examiner—Madeline Gonzalez
(74) Attorney, Agent, or Firm—Edward A. Sokolski

(57) ABSTRACT

A boring tool head has a movable element which can be moved by means of an adjuster relative to a centerline. Attached to the movable element is a cutting tool which moves with the movable element. A hole which is slightly smaller in size than the desired hole is first bored with the boring tool head and its size precisely measured. The fitting of the invention is then clamped onto the boring tool head by means of a clamping lever. The fitting has a position sensor which abuts against the movable element of the boring tool head, an indicator being attached to the sensor which provides an indication of the sensor's lateral position. The indicator is set to zero and the boring tool head adjuster set to bring the movable element of the boring tool head, as indicated on the indicator, to the desired position for increasing the size of the initially bored hole to the desired precise dimension.

3 Claims, 2 Drawing Sheets

TOOL AND METHOD FOR THE PRECISION BORING OF HOLES

Priority is claimed for this application based on Provisional Application No. 60/197,360 filed Apr. 15, 2000.

BACKGROUND OF THE INVENTION

1. Field of the Invention

This invention relates to the boring of holes and more particularly to a device and method for precisely boring holes of a desired size.

2. Description of the Related Art

The precise machining of holes in a work piece to very close tolerances(of the order of 0.0001') as to diameter is required in a number of applications. Prior art methods and apparatus for achieving this end result generally first bore a hole which is slightly smaller than the desired size. The size of this hole is then measured with a dial indicator, bore gage, air gage or gage pins and the cutting tool is adjusted manually by means of its control adjuster to the final desired hole size and the boring then done. A prior method and apparatus along these lines is described in U.S. Pat. No. 3,044,322 issued Jul. 17, 1962 to George. This prior art approach has the shortcoming is that the operator must use a graduated dial face connected to the adjuster to make the final size setting. This device is somewhat expensive and bulky in construction. Further, the accuracy of the setting is affected by the accuracy of the adjuster and its dial face. Also the friction on the moving parts involved can affect such accuracy. Other prior art boring heads do not have dial faces which operate in conjunction with adjusters and thus are not capable of rapid and accurate adjustment.

The device and method of the present invention provides an improvement over these prior art devices by virtue of the reliability of its accuracy and the simplicity and economy of its design.

SUMMARY OF THE INVENTION

In the device of the present invention, a boring tool head has a cutting tool supported by a tool holder which can be moved relative to a centerline by means of an adjuster. A hole slightly smaller in size than a final hole to be bored is first bored and its size precisely measured. A fitting employing a clamping device is then tightly and securely clamped onto the tool head by means of a clamping lever operating in conjunction with a swivel guide. A position sensor mounted on the clamping device abuts against the movable tool head, a position indicator being provided to receive an output signal from the sensor. The indicator is first set to "zero" and the boring tool holder adjuster then set to bring the boring head to the desired location to enable the boring of a hole of the desired dimension.

It is therefore an object of this invention to provide a simple and economical device and method for the accurate boring of a hole of a precisely determined size.

It is a further object of this invention to avoid inaccuracies in the precision boring of holes in a work piece.

Other objects of the invention will become apparent from the following description taken in connection with the accompanying drawings.

DETAILED DESCRIPTION OF THE INVENTION

Referring now to the Figures, a preferred embodiment of the invention is illustrated.

Figure 1:
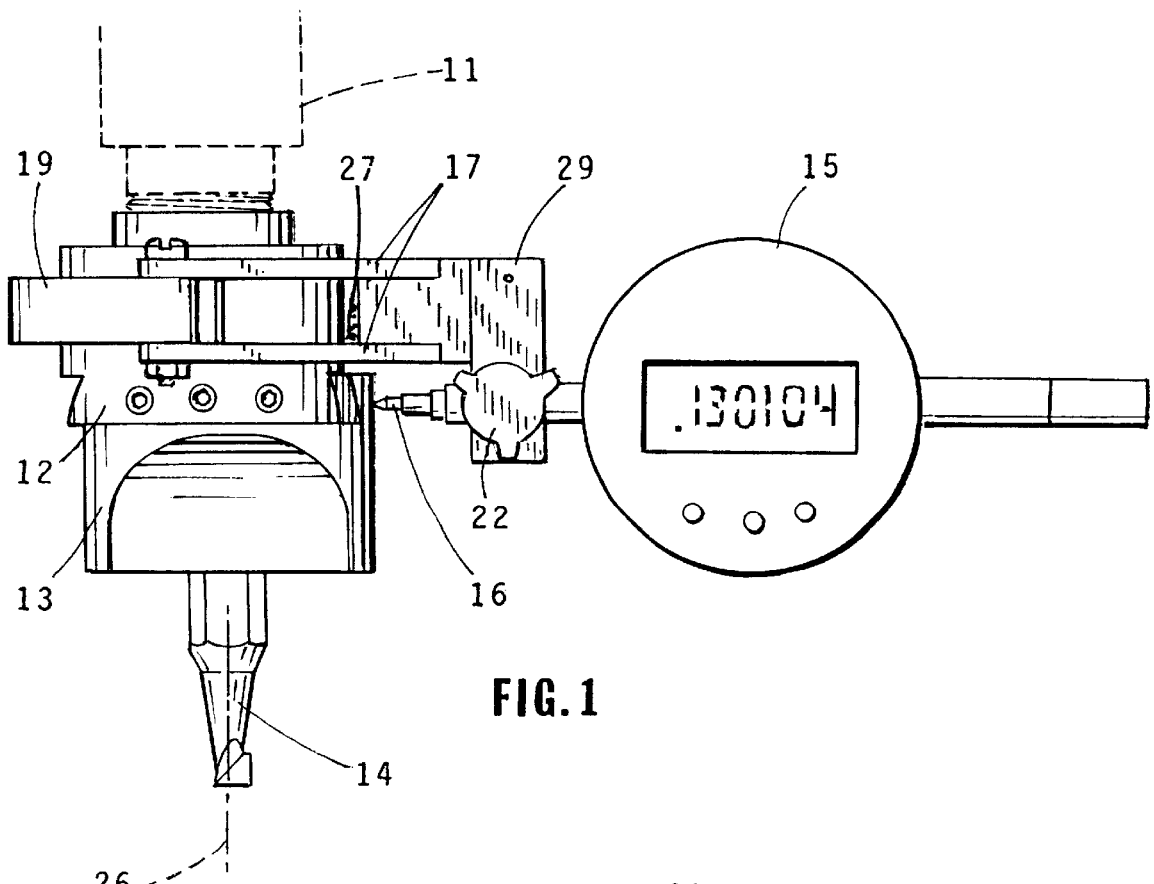
FIG. 1 is a side elevational view of a preferred embodiment of the invention installed on a boring head.
Figure 4:
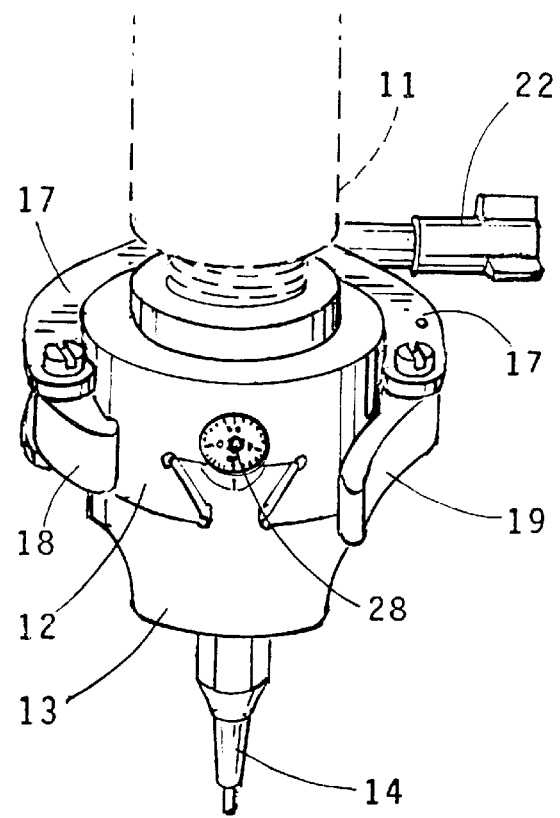
FIG. 4 is front perspective view of the preferred embodiment being attached (or removed) from a boring head.

Boring head 12 is a conventional commercially available tool head such as that described in U.S. Pat. No. 3,044,322. As shown in FIGS. 1 and 4, the head 12 has a movable element 13 which can be moved relative to centerline 26 by means of adjuster 28, which has a dial to indicate the position of the movable element 13. A cutting or boring tool 14 is attached to movable element 13 and moves therewith. A machine spindle 11 which is driven by a motor drive(not shown) is connected through head 12 to tool 14 to effect the boring action thereof. First, a hole is bored which is smaller in size than the desired hole and the size of this hole precisely measured with an accurate gage.

Figure 2:
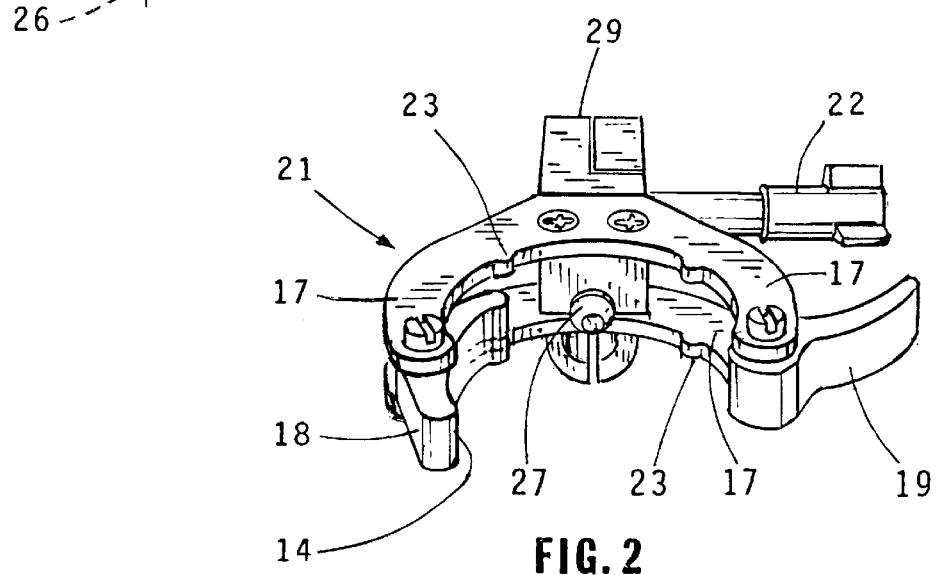
FIG. 2 is front top perspective view of the preferred embodiment of the invention.
Figure 3:
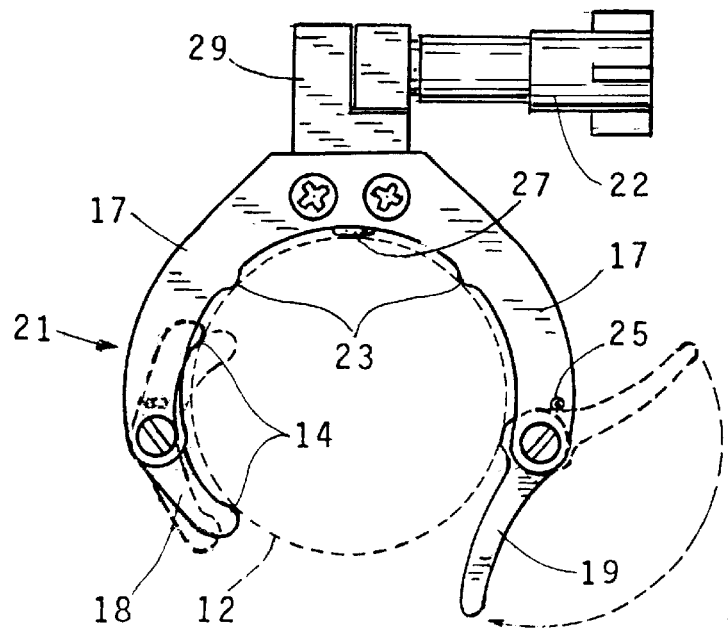
FIG. 3 is a top plan view of the preferred embodiment of the invention.

The fitting 21 of the device of the invention, shown in FIGS. 2 and 3 is then attached to the boring head 12, as shown in FIGS. 1 and 4. Dial indicator 15 is connected to the center support piece 29 of fitting 21 by means of screw clamp 22 as shown in FIG. 1. Tight attachment of fitting 21 is achieved by means of swivel guide 18, the end surfaces 14 of which abut against sides of the boring head 12 in conjunction with cam lock lever 19 which is rotated clockwise from its open position in abutment against stop pin 25. Open ended clamping frames 17, which are substantially semi-circular provide the main structure of the fitting. The frames are in opposing relationship and are joined together by center support piece 29 to form an integral unit. Swivel guide 18 and lock lever 19 are pivotally mounted between opposite end portions of frames 17, respectively. Clamping protrusions 23 formed on the clamping frames 17 and protrusion 27 formed on center support piece 29 enhance the clamping action. Protrusion 27 fits within an aperture(not shown) formed on the rear of the head directly opposite adjuster 28 and thus assures alignment of the adjuster.

With the fitting 21 in the clamped position, position sensor 16 of dial indicator 15(see FIGS. 1 and 2) is in abutment against the boring head movable element 13. The position sensor provides a signal to the indicator in accordance with the lateral position of element 13.

The indicator 15 is now set to zero and the adjuster 28, which may comprise an adjustment screw, for movable head element 13 is set to the desired position, as indicated on indicator 15. In this manner the size of the initially bored smaller hole is increased to the desired dimension. Lever 19 is now moved counter clockwise to release the fitting from the boring head.

The present invention thus provides a simple apparatus and method for accurately setting a boring tool for precisely boring holes of a desired diameter. In view of the tight clamping action against the boring head, slippage is prevented and accuracy of the adjustment is assured.

While the invention has been described and illustrated in detail it is to be understand that this is intended by way of illustration and example only, the scope of the invention being limited by the terms of the following claims.

I claim:

1. A fitting for use in setting a boring tool head in a position for precise boring of a hole, said boring tool head including a movable element which can be moved laterally relative to a predetermined centerline, a boring tool being attached to said movable element, said fitting comprising:

a pair of open ended clamping frames connected together in opposing relationship;

a swivel guide pivotally connected between one of the open ends of said clamping frames;

a lock lever pivotally connected between the other of the open ends of said clamping frames; and a dial indicator mounted on said frames, said indicator having a position sensor extending therefrom towards the center of the frames;

said lever being pivotally positionable to bring said frames in tight abutment against the surface of the boring tool head with the position sensor in abutment against the surface of said movable element, thereby providing a precise indication on said indicator of the lateral position of said movable element.

2. The device of claim 1 and further including clamping contact protrusions formed on said clamping frames, said protrusions abutting tightly against said boring tool head.

3. The device of claim 1 or 2 and further including a protrusion connected to said clamping frames for use in aligning said frames in a predetermined position relative to said boring tool head.

* * * * *